UNITED STATES PATENT OFFICE.

LOUIS CLERC, OF PARIS, FRANCE.

PROCESS OF PRESERVING MILK.

SPECIFICATION forming part of Letters Patent No. 626,486, dated June 6, 1899.

Application filed February 17, 1899. Serial No. 705,786. (No specimens.)

*To all whom it may concern:*

Be it known that I, LOUIS CLERC, a citizen of the French Republic, residing at Paris, France, have invented a new and useful Improved Process of Preserving Milk, of which the following is a specification.

This invention relates to a mode of treating milk which will insure its preservation in an unaltered condition for a very considerable time when kept in the closed vessels used in the sale of milk.

The process is carried out in the following-described manner: As soon as possible after the milk is obtained it is put into a strong vessel and subjected to a pressure of several kilograms by forcing into the vessel carbonic-acid gas. The milk is allowed to remain under the pressure of the gas for some hours, when it is heated in the containing vessel up to 70° centigrade, this temperature being maintained for from forty to forty-five minutes. This heating of the milk up to 70° centigrade while under pressure of the carbonic acid destroys the lactic ferments and the pathogenic microbes in the milk without imparting to or leaving in the milk any disagreeable flavor. At the termination of the heating the vessel is opened while the milk is still warm and the carbonic acid escapes. The vessel containing the milk is now charged with oxygen gas under pressure, the oxygen replacing the carbonic acid, and the milk may now be kept under such pressure as long as may be desired without its being liable to change.

Where the milk has been treated as above described in a special vessel and is to be transferred to other vessels for sale, it is transferred to the latter vessels and the latter are charged with oxygen gas under pressure. As a final measure of protection in such cases and to insure the destruction of any pathogenic microbes which may have been introduced in effecting the transfer from one vessel to another the milk is again heated up to 70° centigrade or pasteurized.

As the two heating operations for effecting the pasteurizing take place at a temperature which does not exceed 70° centigrade, the butyric ferments, which are useful for insuring the assimilation of the milk, are not destroyed by this heating and the treated milk preserves its normal flavor perfectly.

The receptacles for holding the milk offered for sale and distribution under compressed oxygen gas may be of any kind having suitable closures, as siphons, ball-stoppered bottles, &c., the receptacles being themselves sterilized, by preference, before filling.

Having thus described my invention, I claim—

1. The herein-described method of treating milk in order to preserve it, which consists in first charging the vessel containing the milk, with carbonic acid under pressure, then heating the milk while under such pressure up to a temperature sufficient to destroy the lactic ferments and pathogenic microbes in the milk, and then storing the milk under oxygen under pressure, substantially as set forth.

2. The herein-described method of treating milk in order to preserve it, which consists in charging the vessel containing the milk with carbonic acid under pressure, then heating the milk while under pressure up to about 70° centigrade, then discharging the carbonic acid, and recharging the vessels with oxygen under pressure while the milk is still warm, substantially as set forth.

In witness whereof I have hereunto signed my name, this 1st day of February, 1899, in the presence of two subscribing witnesses.

LOUIS CLERC.

Witnesses:
EDWARD P. MACLEAN,
ALEXANDRE MATHIEU.